United States Patent
Yang et al.

(10) Patent No.: US 12,464,253 B2
(45) Date of Patent: Nov. 4, 2025

(54) LIGHT-EMITTING DIODE (LED) FLICKERING MANAGEMENT (LFM) FOR SPATIALLY MULTIPLEXED IMAGE SENSOR

(71) Applicant: CISTA SYSTEM CORP., Grand Cayman (KY)

(72) Inventors: Shenglong Yang, Taipei (TW); Zhaojian Li, Fremont, CA (US)

(73) Assignee: Cista System Corp., Grand Cayman (KY)

( * ) Notice: Subject to any disclaimer, the term of this patent is extended or adjusted under 35 U.S.C. 154(b) by 160 days.

(21) Appl. No.: 18/526,432

(22) Filed: Dec. 1, 2023

(65) Prior Publication Data

US 2025/0184617 A1    Jun. 5, 2025

(51) Int. Cl.
| | |
|---|---|
| *H04N 23/745* | (2023.01) |
| *H04N 23/71* | (2023.01) |
| *H04N 23/72* | (2023.01) |
| *H04N 23/73* | (2023.01) |
| *H04N 23/741* | (2023.01) |
| *H04N 23/743* | (2023.01) |

(52) U.S. Cl.
CPC ........... *H04N 23/745* (2023.01); *H04N 23/71* (2023.01); *H04N 23/72* (2023.01); *H04N 23/73* (2023.01); *H04N 23/741* (2023.01); *H04N 23/743* (2023.01)

(58) Field of Classification Search
CPC .... H04N 23/745; H04N 23/743; H04N 23/73; H04N 23/741; H04N 23/72; H04N 23/71

USPC .......................................................... 348/226
See application file for complete search history.

(56) References Cited

U.S. PATENT DOCUMENTS

| | | | |
|---|---|---|---|
| 2014/0301062 A1* | 10/2014 | David | F21V 3/00 362/84 |
| 2017/0131200 A1* | 5/2017 | Raveh | G01N 21/21 |
| 2019/0208106 A1* | 7/2019 | Lukac | G06T 5/94 |
| 2022/0391012 A1* | 12/2022 | Vertegaal | G06V 40/16 |

FOREIGN PATENT DOCUMENTS

| | | | | |
|---|---|---|---|---|
| DE | 102017110129 A1 | * | 11/2018 | ............. H04N 23/71 |
| WO | WO-2016178712 A1 | * | 11/2016 | ............. H04N 23/74 |

* cited by examiner

*Primary Examiner* — Lin Ye
*Assistant Examiner* — Steven Daniel Barry
(74) *Attorney, Agent, or Firm* — Sheppard Mullin Richter & Hampton LLP

(57) ABSTRACT

This application describes method and apparatus for LED Flickering Management (LFM) using spatially multiplexed image sensors. An example method includes configuring the sensor with diverse exposure settings to capture images of a scene with an LED light source. For each pixel position, multiple intensity values are collected across these images. An estimated linear regression model, incorporating an estimated Quantum Efficiency (QE) factor, is constructed using these values. The pixel intensities are then adjusted based on this estimated QE factor, aligning them with the regression model. This process results in modified images of the scene, effectively managing LED flickering for accurate image capture.

20 Claims, 7 Drawing Sheets

2.1 Preconfigured exposure settings with observed intensity values 2.2 Adjusted pixel intensity values based on the linear regression model

LIGHT-EMITTING DIODE (LED) FLICKERING MANAGEMENT (LFM) FOR SPATIALLY MULTIPLEXED IMAGE SENSOR

TECHNICAL FIELD

The disclosure relates generally to apparatus, system, and method for Light-Emitting Diode (LED) Flickering Management (LFM) for image sensors.

BACKGROUND

LEDs, or Light Emitting Diodes, emit light in pulses rather than a continuous stream. This pulsating emission is controlled using a technique called Pulse Width Modulation (PWM) at a specific frequency. PWM involves turning the LED on and off rapidly, and the duration for which the LED is on during each cycle determines its brightness. In the context of capturing LED emissions, digital sensors like CMOS (Complementary Metal-Oxide-Semiconductor) cameras use exposure time, which is the duration for which the sensor is exposed to light, to capture these light pulses.

In this scenario, the exposure time of the CMOS sensor is synchronized with the PWM cycle of the LED. This synchronization ensures that the sensor captures the LED emissions accurately. To obtain comprehensive and precise information about the LED light, it's crucial for the exposure time of the CMOS sensor to cover the entire cycle of the PWM. This means that the exposure time should encompass both the LED's on and off periods within a single PWM cycle.

However, a challenge arises because the specific frequency of the LED's PWM cycle is often unknown or not readily available. Without this information, it becomes difficult to precisely match the exposure time of the CMOS sensor to the LED's PWM cycle. This lack of knowledge about the LED's frequency complicates the task of ensuring the sensor captures the complete LED cycle, leading to potential gaps in the data captured by the camera sensor.

This application describes a novel solution to the above-identified challenges using spatially multiplexed image sensors. By employing spatially multiplexed pixels in those sensors with varied exposure times, the likelihood of capturing the complete cycle of the LED's PWM emissions increases. This approach, coupled with regression techniques, corrects under-sampling, ensuring accurate representation of the LED light source even without precise PWM frequency knowledge.

SUMMARY

Various embodiments of this specification may include hardware circuits, systems, and methods for LFM using spatially multiplexed image sensors.

In some aspects, the techniques described in this context revolve around a method called Light-Emitting Diode (LED) Flickering Management (LFM) designed for a spatially multiplexed image sensor. The method involves several key steps: first, configuring the image sensor with various exposure settings to capture multiple images of a scene containing an LED light source. For each pixel position in these images, a set of pixel intensity values is gathered across the images. Next, an estimated linear regression model is constructed based on these pixel intensity values, incorporating an estimated Quantum Efficiency (QE) factor among them. The pixel intensity values at each position across the images are then adjusted using this estimated QE factor, aligning them with the estimated linear regression model. The outcome of this adjustment process is a series of modified images capturing the scene with the LED light source.

In some aspects, the plurality of different exposure settings correspond to linearly increased exposure times by a predetermined factor.

In some aspects, the plurality of different exposure settings include an initial setting with a base exposure time, and subsequent exposure settings have exposure times that are linearly increased from a previous exposure setting by the predetermined factor.

In some aspects, the image sensor is a quad image sensor including a plurality of quaternions, each of the plurality of quaternions including a matrix of sensor pixels.

In some aspects, the configuring the image sensor to capture a plurality of images using a plurality of different exposure settings includes: configuring exposure time for sensor pixels in the quad image sensor such that the matrix of sensor pixels within each quaternion have different exposure times, and corresponding sensor pixels across the plurality of quaternions have a same exposure time.

In some aspects, the corresponding pixels having the same exposure time across the plurality of quaternions capture one of the plurality of images.

In some aspects, the adjusting the plurality of pixel intensity values using the estimated QE factor includes: identifying a first pixel intensity value of the plurality of pixel intensity values that captures an ON cycle of the LED light source; identifying a second pixel intensity value of the plurality of pixel intensity values that captures an OFF cycle of the LED light source; and adjusting the second pixel intensity value based on the first pixel intensity value and the estimated QE factor.

In some aspects, the adjusting the plurality of pixel intensity values using the estimated QE factor includes: identifying a first pixel intensity value from the plurality of pixel intensity values, wherein the first pixel intensity value corresponds to a first pixel and has a distance away from the estimated linear regression model that is greater than a threshold; obtaining, from the plurality of pixel intensity values, a second pixel intensity value corresponding to a second pixel; and adjusting the first pixel intensity value of the first pixel based on the second pixel intensity value of the second pixel, the estimated QE factor, and exposure times corresponding to the first pixel and the second pixel.

In some aspects, in response to an exposure time of the second pixel being greater than an exposure time of the first pixel by the predetermined factor, the adjusting the first pixel intensity value includes: changing the first pixel intensity value to the second pixel intensity value divided by the estimated QE factor.

In some aspects, in response to an exposure time of the second pixel being shorter than an exposure time of the first pixel by the predetermined factor, the adjusting the first pixel intensity value includes: changing the first pixel intensity value to the second pixel intensity value multiplied by the estimated QE factor.

In some aspects, the LFM method further includes: before adjusting the plurality of pixel intensity values using the estimated QE factor, fine-tuning the estimated QE factor in the linear regression model corresponding to a first pixel position based on QE factors corresponding to pixel positions surrounding the first pixel position.

In some aspects, the LFM method further includes: performing High Dynamic Range (HDR) fusion on the plurality of adjusted images to generate an HDR image of the scene including the LED light source.

In some aspects, the techniques described herein relate to a system, including one or more processors and one or more non-transitory computer-readable memories coupled to the one or more processors and configured with instructions executable by the one or more processors to cause the system to perform operations including: configuring the image sensor with a plurality of different exposure settings to capture a plurality of images of a scene comprising an LED light source; for each pixel position in the plurality of images: obtaining a plurality of pixel intensity values at the pixel position across the plurality of images; constructing an estimated linear regression model among the plurality of pixel intensity values, wherein the estimated linear regression model comprises an estimated Quantum Efficiency (QE) factor among the plurality of pixel intensity values; adjusting the plurality of pixel intensity values at the pixel position across the plurality of images using the estimated QE factor such that the adjusted pixel intensity values are aligned with the estimated linear regression model; and obtaining a plurality of adjusted images capturing the scene comprising the LED light source as a result of the adjusting the plurality of pixel intensity values at each pixel position in the plurality of images.

In some aspects, the techniques described herein relate to a non-transitory computer-readable storage medium configured with instructions executable by one or more processors to cause the one or more processors to perform operations including: configuring the image sensor with a plurality of different exposure settings to capture a plurality of images of a scene comprising an LED light source; for each pixel position in the plurality of images: obtaining a plurality of pixel intensity values at the pixel position across the plurality of images; constructing an estimated linear regression model among the plurality of pixel intensity values, wherein the estimated linear regression model comprises an estimated Quantum Efficiency (QE) factor among the plurality of pixel intensity values; adjusting the plurality of pixel intensity values at the pixel position across the plurality of images using the estimated QE factor such that the adjusted pixel intensity values are aligned with the estimated linear regression model; and obtaining a plurality of adjusted images capturing the scene comprising the LED light source as a result of the adjusting the plurality of pixel intensity values at each pixel position in the plurality of images.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown, but is to be accorded the widest scope consistent with the principles and features disclosed herein.

There are various ways to implement LFM, either on the LED side or on the image sensor side. For example, LED-based LFM methods may include increasing the PWM frequency, using a continuous current to power LEDs instead of PWM to eliminate flicker entirely, etc., Image sensor-based LFM methods may include synchronizing the exposure time of the image sensor with the frequency of the LED flickering, adaptive exposure control where the exposure time of the sensor is adjusted dynamically based on the detected frequency of LED flickering, etc.

This application focuses on the image sensor-based LFM methods (i.e., LFM on the sensor side) by configuring spatially multiplexed pixels in an image sensor with linearly increasing exposure times, followed by fine-tuning the captured frames with estimated Quantum Efficiency (QE) factors to obtain smoothened frames.

Figure 1A:
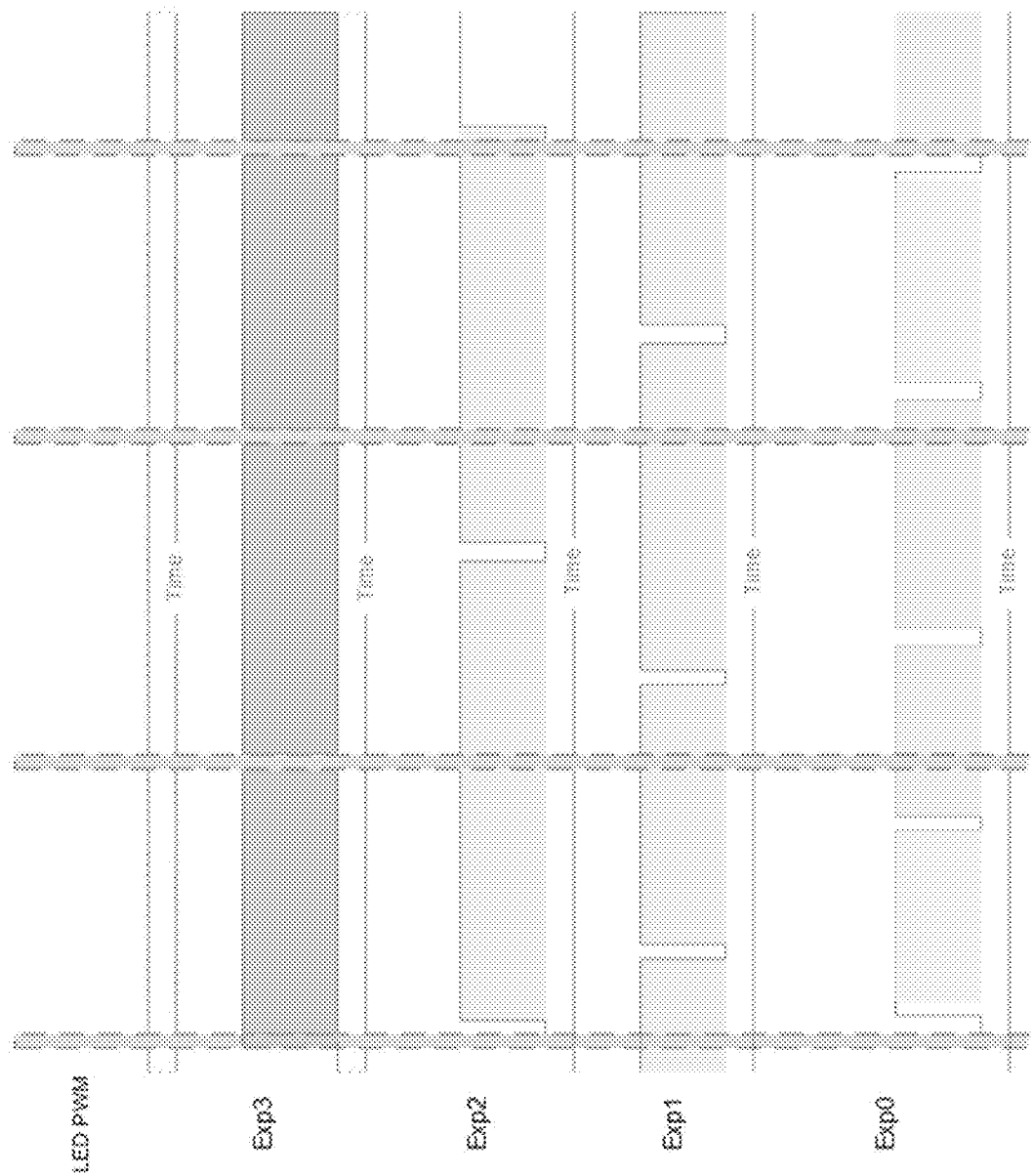
FIG. 1A illustrates capturing a scene of LED light source(s) using an image sensor with different exposure settings.

FIG. 1A illustrates capturing a scene of LED light source(s) using an image sensor with different exposure settings. As explained in the background section, flickering is a common occurrence in LED light sources, such as traffic signals and signboards, due to their repetitive ON/OFF cycles. These fluctuations in light intensity, although not visible to the human eye, can be detected by sensors designed to pick up such flickers. When exposed to these fluctuations, sensors may incorrectly interpret the working condition of LED light sources, adversely affecting the performance of embedded vision systems.

For example, autonomous vehicles rely on cameras to detect and interpret traffic signals, including those illuminated by LED lights; many urban areas now use LED streetlights for energy efficiency. Autonomous vehicles navigating roads at night encounter different street lighting conditions, including flickering LED lights. Surveillance cameras in public places like airports, train stations, and shopping malls might encounter flickering LED lights from various sources, such as display panels, advertising boards, or decorative lighting. Modern sports arenas use LED lighting systems for energy efficiency. Cameras capturing live sports events need to contend with the flickering caused by these LED lights.

As shown in FIG. 1A, the LED Pulse Width Modulation (PWM) has ON/OFF cycles.

An image sensor with a long exposure time (e.g., Exp3) has a better chance to capture more ON cycles of the LED light source, but another image sensor with a shorter exposure time (e.g., Exp2 or Exp0) may miss some of the On cycles of the LED light source. In other words, setting a longer exposure time allows the sensor to collect light over an extended period, increasing the probability of capturing more ON cycles of the LED. This results in a more stable and continuous illumination representation in the captured image.

However, despite the advantages of longer exposure times, there are disadvantages to consider. Longer exposures lead to the sensor capturing more light, potentially causing overexposure. Overexposed images lose details in bright areas, significantly impacting image quality. Moreover, in environments with varying light sources, longer exposures might introduce motion blur or capture unintended light sources, further complicating the image capture process. Given these practical limitations, relying solely on longer exposure times for LED LFM purposes is not practical. The rest of the application introduces an LFM method using spatially multiplexed image sensor with hybrid exposure settings.

Figure 1B:
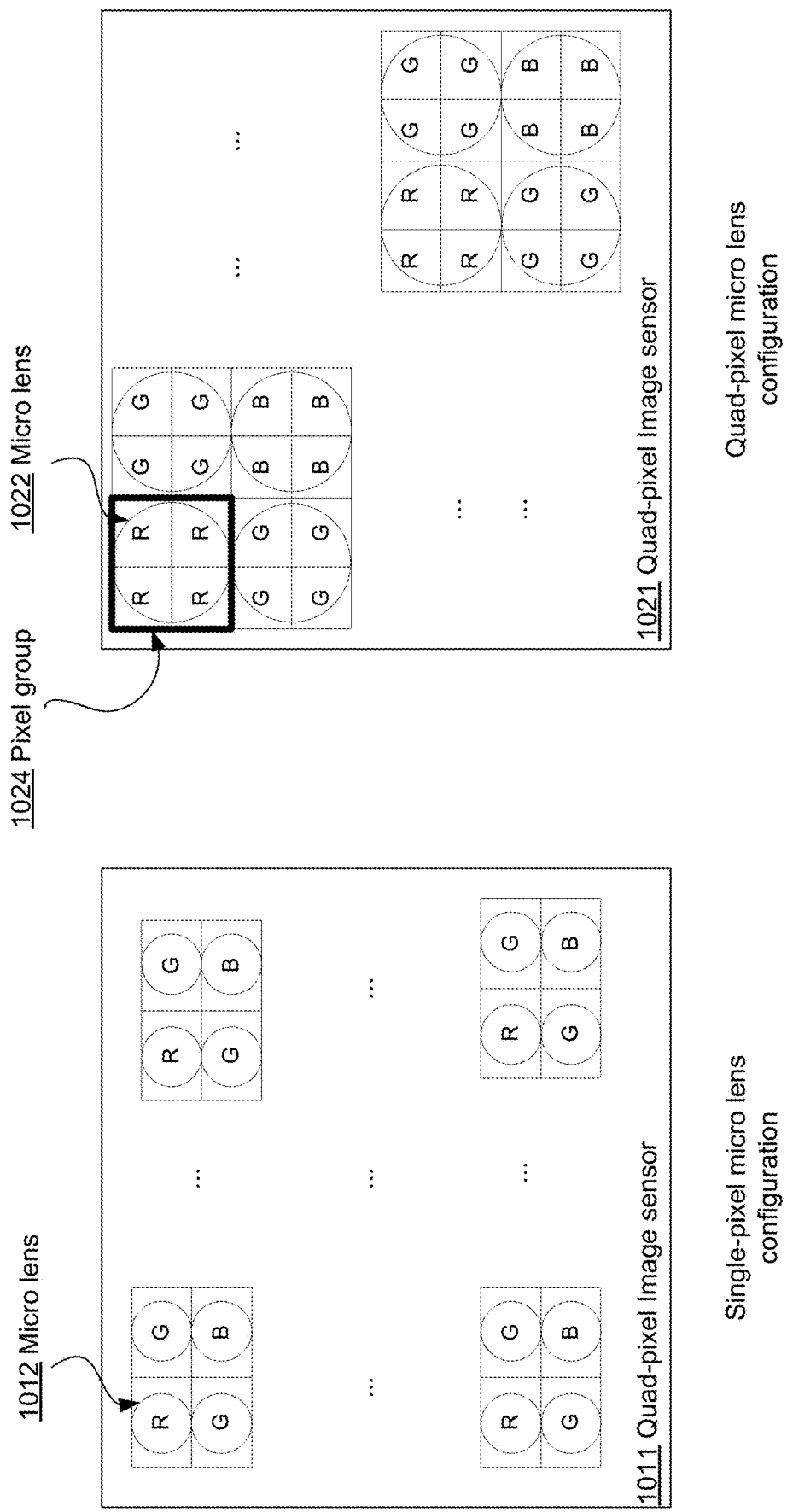
FIG. 1B illustrates exemplary spatially multiplexed image sensors, according to some embodiments of this specification.

FIG. 1B illustrates exemplary spatially multiplexed image sensors, according to some embodiments of this specification. A spatially multiplexed image sensor may have a matrix of pixels in a group. A common example is quad-pixel image sensor with quad-pixel units, also called quaternions (or quad), each of which includes four sensor pixels arranged in a square or rectangular pattern.

In some embodiments, the sensor pixels within the same group capture the different colors (using different color filters), such as the quad-pixel image sensor 1011. In some embodiments, the sensor pixels within the same group capture the same color (using the same color filters), such as the quad-pixel image sensor 1021.

Each spatially multiplexed image sensor may include a plurality of microlenses or photosites covering the sensor pixels. A microlens is a small lens, generally with a diameter less than a millimeter (mm) and could be less than 2 micrometers (μm) when pixel size scales below 2 μm. A typical microlens may be a single element with one plane surface and one spherical convex surface to refract the light. The plurality of microlenses are sometimes arranged as an array, such as a one-dimensional or two-dimensional array on a supporting substrate. Single micro-lenses may be used to couple light to the covered sensor pixels or photodiodes; microlens arrays may be used to increase the light collection efficiency of CCD arrays and CMOS sensors, to collect and focus light that would have otherwise fallen onto the non-sensitive areas of the sensors.

Different spatially multiplexed image sensors may have different microlens configurations for each pixel group. FIG. 1A illustrates a single-pixel microlens configuration in the image sensor 1011, and a quad-pixel microlens configuration in the image sensor 1021. In the single-pixel microlens configuration, the sensor pixels in the image sensor 1011 are respectively covered by microlenses 1012 for coupling lights to the covered sensor pixels. In contrast, in the quad-pixel microlens configuration, one microlens 1022 is configured to cover a two-by-two matrix of sensor pixels 1024 (also called a pixel group), and the sensor pixels in the pixel group 1024 are covered with color filters of the same color.

The following figures and descriptions introduce the LFM method using a spatially multiplexed image sensor. For simplicity, the LFM method assumes that the spatially multiplexed image sensor can have different exposure configurations at pixel-level, regarding less how the pixels or microlenses are configured.

Note that the term "pixels" in this description may have different meaning depending on the context. When the term "pixels" refers to the basic physical elements in an image sensor, it may be understood as sensor pixels, photosites, or CCD or CMOS sensors. Each of such physical pixel in the sensor is a photodetector that captures light photons.

The term "pixels" may also be used to refer to the smallest unit of a digital image displayed on screens like computer monitors, TVs, or smartphone displays. Each pixel in an image represents a specific color and brightness at a specific point in the image. A person skilled in the art reading this application would appreciate when the term "pixels" are (1) physical components that capture light and convert it into electrical signals, forming the raw data for an image, or (2) elements of a screen that render this data visually as part of a digital image.

Figure 2:
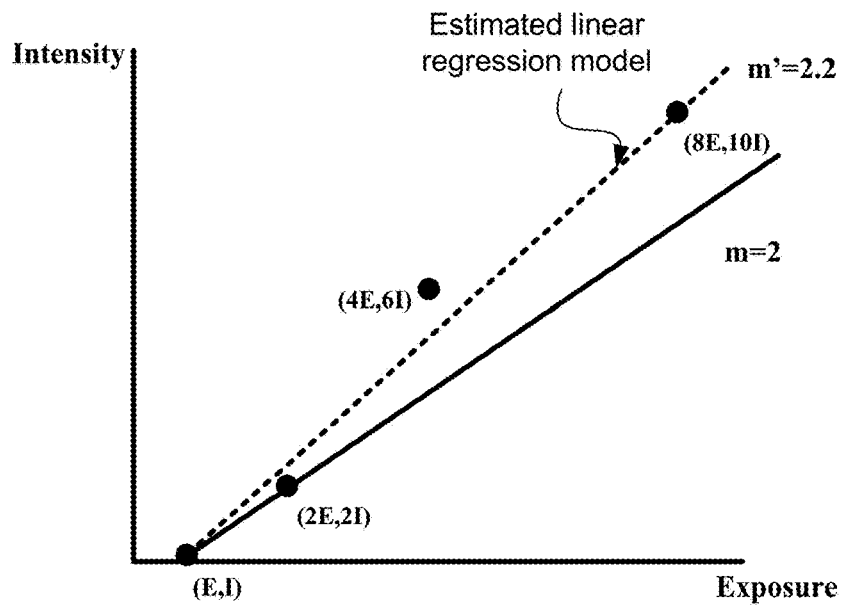
FIG. 2 illustrates the relationship between exposure settings and pixel intensities in the context of LFM using a spatially multiplexed image sensor, according to some embodiments of this specification.
Figure 2:
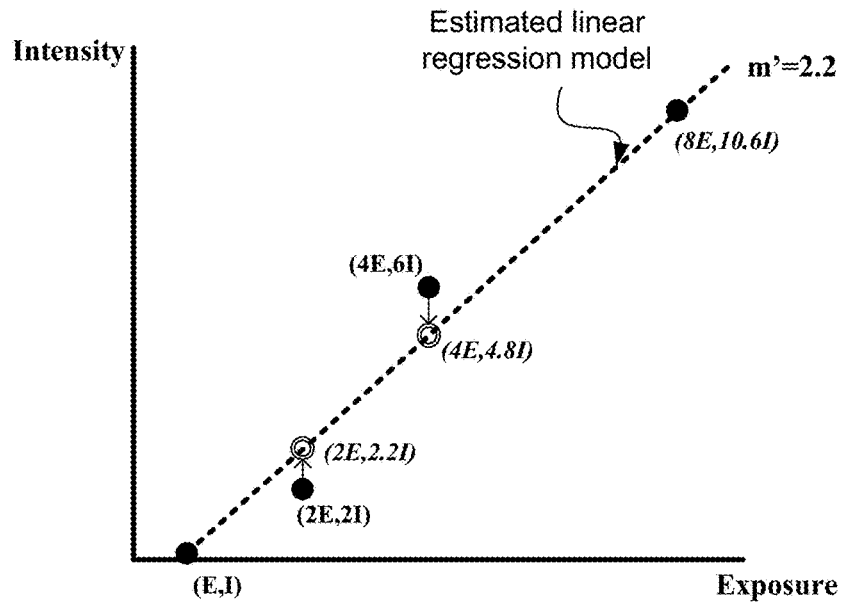

FIG. 2 illustrates the relationship between exposure settings and pixel intensities in the context of LFM using a spatially multiplexed image sensor, according to some embodiments of this specification.

As shown in the diagrams in FIG. 2, the x-axis represents exposure time (exposure settings that controlled by the image sensor), and the y-axis represents the observed pixel intensity (e.g., the brightness read from a given pixel). In the illustrated example in diagram 2.1, there are four pixels configured with different exposure settings (E, 2E, 4E, and 8E), in which the lowest exposure time is E, and the next exposure time is two times longer, i.e., 2E. The pattern continues until the longest exposure time being 8E. The solid line in diagram 2.1 with a slope of m=2 represents the linear relationship among the exposure settings.

While the increase of the exposure time among the four exposure configurations is linear (i.e., 2×), the observed pixel intensity values or brightness reads from these pixels capturing the scene with the LED light source might not be strictly linear. This is because some of the pixels may capture the ON cycles of the LED light source while other pixels may capture the OFF cycles of the LED light source. In this particular example, the four observed pixel intensity values are I, 2I, 6I and 10I, where I represents the base value of the pixel intensity observed at the lowest exposure time.

In some embodiments, a linear regression model is constructed to approximate the linear relationship between the observed pixel intensity values of the pixels. The dotted line in FIG. 2.1 of FIG. 2 with an estimated slope of m'=2.2 represents a potential linear regression model. The slope of m'=2.2 may also be considered as related to the Quantum Efficiency (QE) factor. This QE factor of these four pixels may be used to fine-tune the pixel intensity values, as shown in diagram 2.2 in FIG. 2.

As shown, the fine-tuned pixel intensities of the pixels (other than the base pixel) are 2.2I, 4.8I, and 10.6I, to align with the estimated linear regression model.

Figure 4:
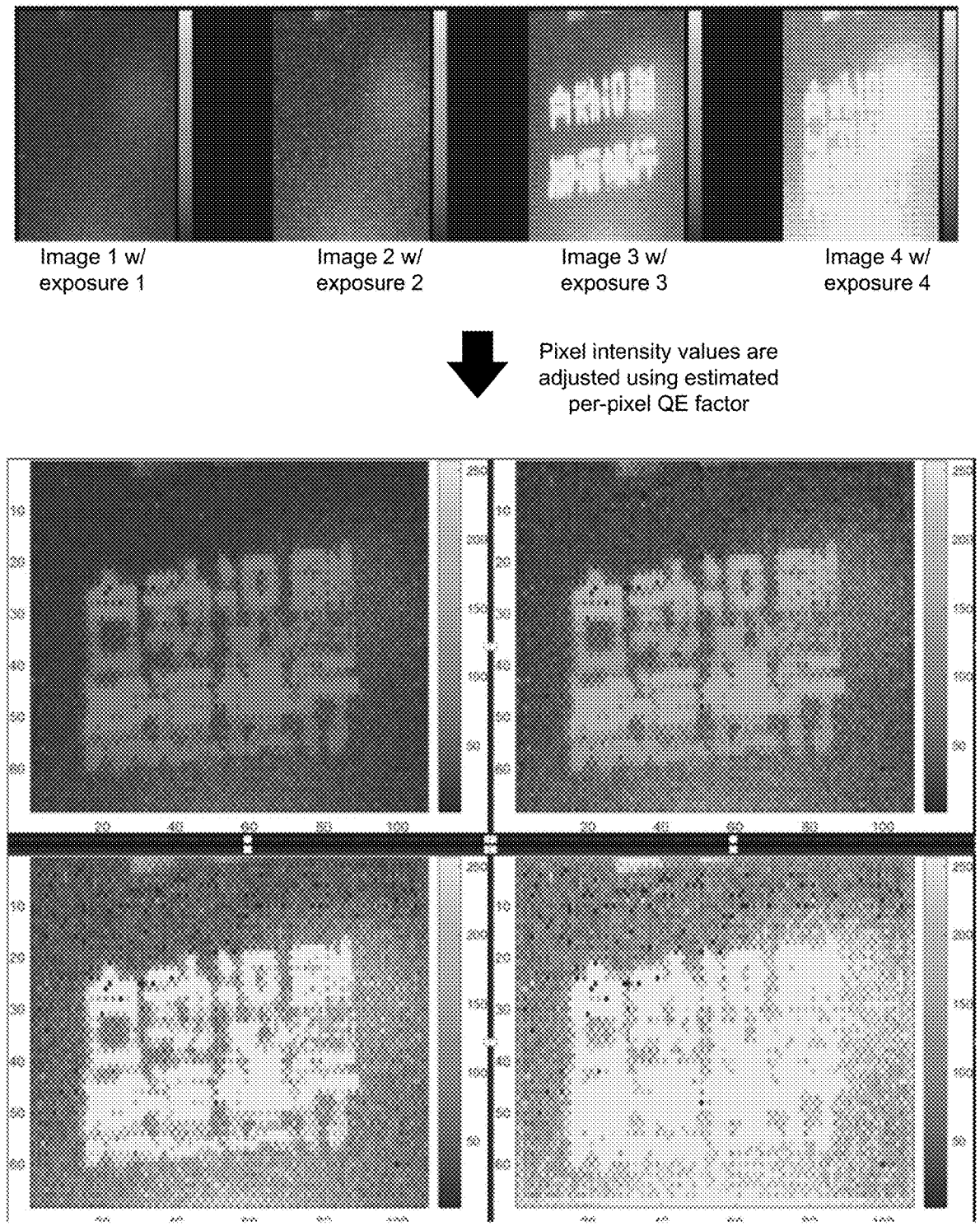
FIG. 4 illustrates an example effect of LFM using a quad-pixel image sensor, according to some embodiments of this specification.

In the example illustrated in FIG. 2, the four pixels may refer to the quad-pixels from the same pixel quaternion of a quad-pixel image sensor. The image sensor may include a plurality of pixel quaternions, and the pixels with the same exposure setting across the plurality of quaternions capture one frame of the scene. Therefore, in a quad-pixel image sensor with four exposure settings within each pixel quaternion may capture four frames of the same scene. By performing the above-described process including constructing an estimated linear regression model and fine-tuning the pixel intensity values for each of all pixel quaternions in the image sensor, the LED light captures across the four frames are smoothened. An example illustration of the effect is shown in FIG. 4. Then the smoothened frames may be used to perform other type of image processing tasks such as High Dynamic Range (HDR) fusion to generate a final image with a broader range of luminance levels than what a single exposure can capture. The generated final image has enhanced detail in both shadows and highlights A person skilled in the art would be able to enhance this approach to other more advanced spatially multiplexed image sensors with larger pixel quaternions (e.g., 8 pixels per quaternion, 16 pixels per quaternion).

Figure 3:
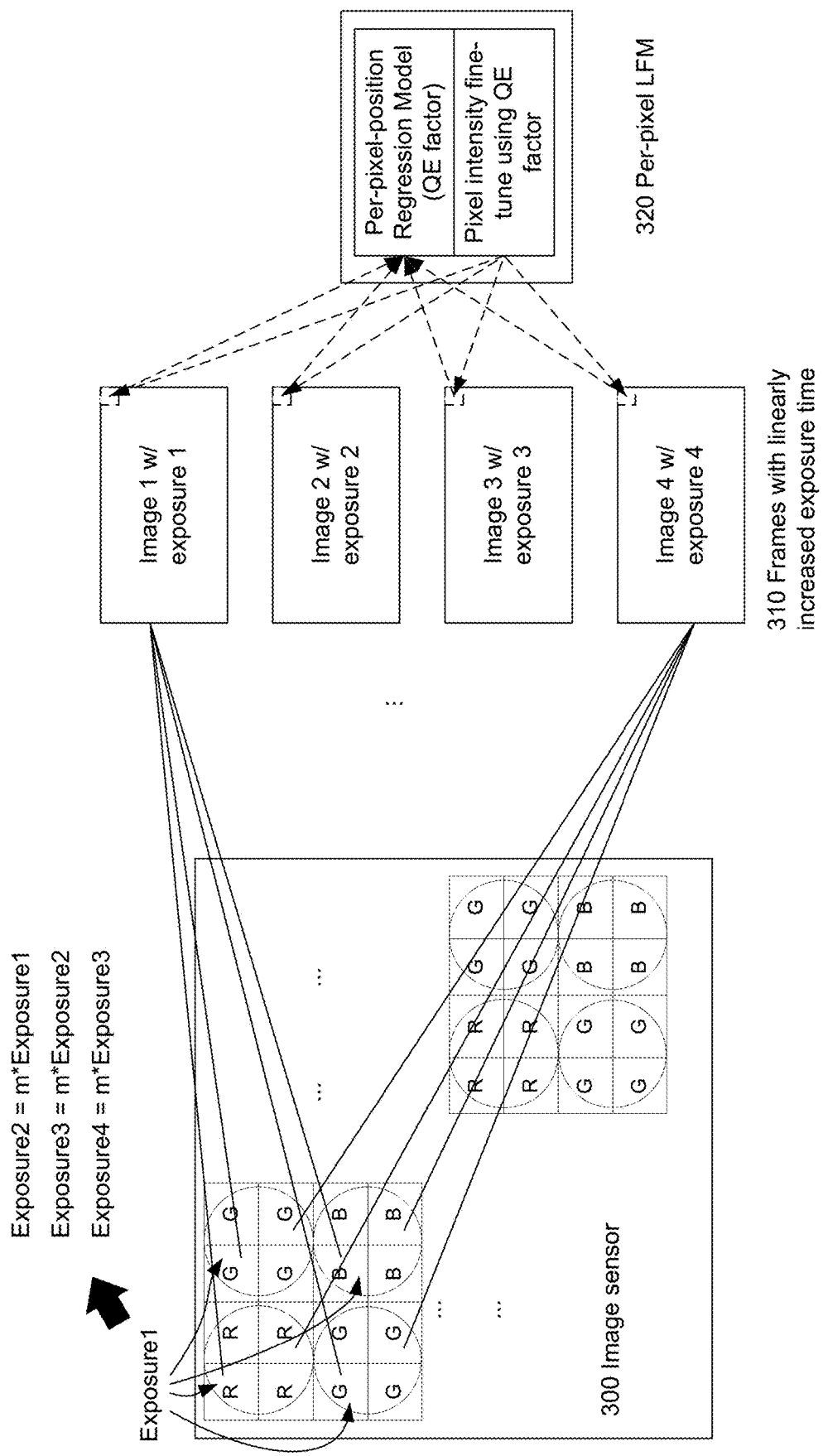
FIG. 3 illustrates a diagram of an example LFM using a quad-pixel image sensor, according to some embodiments of this specification.

FIG. 3 illustrates a diagram of an example LFM using a quad-pixel image sensor 300, according to some embodiments of this specification. The specific quad-pixel image sensor 300 in FIG. 3 is used as an example to illustrate how the LFM method works, a person skilled in the art would easily apply the LFM method for other types of spatially multiplexed image sensors, e.g., each quaternion with four pixels covered by different color filters, or each quaternion with six or either pixels, etc.

As shown, the quad-pixel image sensor 300 includes a plurality of quaternions, each with four pixels. In some embodiments, the LFM method may start with configuring the pixels within each quaternion with linearly increased exposure settings, i.e., the exposure time for each pixel in the same quaternion increases linearly, with the common ratio denoted as m (e.g., m=2 in FIG. 2). For example, all top-left pixels from all quad-pixel quaternions in the image sensor are configured with a short exposure time such as 1/100 seconds (10 milliseconds), denoted as Exposure1 in FIG. 3; the top-right pixels from all quad-pixel quaternions in the image sensor are configured with Exposure2=m*Exposure1; the bottom-left pixels from all quad-pixel quaternions in the image sensor are configured with Exposure3=m*Exposure2=$m^2$Exposure1; and the bottom-right pixels from all quad-pixel quaternions in the image sensor are configured with Exposure4=m*Exposure3=$m^2$*Exposure2=$m^3$Exposure1. The value of the common ratio, i.e., the exposure increasing rate among the pixels within the same quaternion, may be a fixed integer or floating number that is greater than one. A person skilled in the art would appreciate that the selection of the common ratio should avoid causing overexposure at the pixel with the greatest exposure time in each quaternion. The selected common ratio may be the same for all quaternions in the same image sensor.

Using this configured image sensor to capture a scene with one or more LED light sources, the pixels from the same pixel position across the plurality of quaternions (i.e., the pixels across the plurality of quaternions with the same exposure settings) will produce one frame of the scene using the particular exposure configuration. This way, the quad-pixel image sensor produces four frames 310 in total.

The four frames 310 may then be fed into a per-pixel LFM pipeline 320 for fine-tuning the pixel intensities. In some embodiments, as a first step of the per-pixel LFM pipeline 320, a linear regression model may be constructed for each pixel position (e.g., top-left, top-right, bottom-left, and bottom-right of each quaternions) across the plurality of frames 310 to approximate a linear relationship. The model represents the relationship between the linearly increased exposure times and the non-linearly changed pixel intensity values. As explained in FIG. 2, because the LED light sources have ON/OFF cycles, the observed pixel intensity values, e.g., brightness, might not be proportional to the exposure time. Therefore, the linear regression model may also be referred to as an estimated linear regression model among the plurality of pixel intensity values.

As an example, FIG. 3 shows that the top-right pixel from all four frames 310 are used to construct a per-pixel-position regression model. The per-pixel-position regression model may include a coefficient, e.g., the slope, to approximate a linear relationship between the observed pixel intensities. The coefficient effectively encompasses the Quantum Efficiency (QE) factor of the image sensor. The estimated QE factors is a measure of how efficiently the pixels in the image sensor convert incident photons (from the LED light during ON cycles) into electrons, which are then processed to create a digital image. In the context of exposure time, a higher QE factor means that the sensor can capture more photons during a given exposure period. As a result, with all other factors being equal, a sensor with higher QE will produce a brighter image when exposed for the same duration compared to a sensor with lower QE.

Back to the example in FIG. 3, the four pixels, e.g., the top-right pixels from the four frames, have different pixel intensity values (brightness) and exposure times, and it is known that the exposure times of the four pixels is linear with a slope of m. Therefore, assuming all of the four pixels capture the ON cycles of the LED source, the brightnesses of the four pixels should be linear or close to linear as well. When the observed pixel brightnesses have outliers, it means some pixel's exposure setting fails (referred to dark pixels) to capture the ON cycle due to misalignment between the LED cycle and the sensor exposure settings.

By fitting an estimated linear regression model to the pixel brightness values, the coefficient of the model represents how the pixel brightness of a given pixel should've been in relationship to its neighboring pixels' brightnesses and their respectively exposure time settings. Referring to FIG. 2, the coefficient of m'=2.2 of the estimated linear regression model indicate that: if pixel A has an exposure time E and a brightness of I, then pixel B with an exposure time 2*E should have a brightness 2.2*I. Similarly, pixel C with an exposure time $2^2$*E should have a brightness $2.2^2$*I.

Referring back to FIG. 3, as a second step of the per-pixel LFM pipeline 320, the coefficient, i.e., the estimated QE factor, may be used for the particular pixel position to fine-tune the pixel brightnesses such that the adjusted pixel intensity values are aligned with the estimated linear regression model (as the example shown in FIG. 2). This fine-tuning process effectively forces the dark pixels to bright up proportionally to the other pixels' brightness according to their different exposure times.

In some embodiments, the fine-tuning process may include identifying a first pixel intensity value of the plurality of pixel intensity values that captures an ON cycle of the LED light source; identifying a second pixel intensity value of the plurality of pixel intensity values that captures an OFF cycle of the LED light source (e.g., a dark pixel); and adjusting the second pixel intensity value based on the first pixel intensity value and the estimated QE factor. Note that the plurality of pixel intensity values are the observed pixel brightnesses of the pixels from the same pixel position across the frames 310.

In a more detailed embodiment, the fine-tuning process may first identify a specific intensity value associated with a first pixel from the plurality of pixel intensity values. This first pixel intensity value corresponds to a particular pixel and is distinguished by its distance from the estimated linear regression model, surpassing a predefined threshold. Subsequently, another pixel intensity value may be selected from the plurality of pixel intensity values. Then key step may involve adjusting the initially identified intensity value of the first pixel. This adjustment is made based on the intensity value of the second pixel, the estimated QE factor for this group of pixels, and the exposure times linked to both the first and second pixels. If the exposure time of the second pixel being greater than the exposure time of the first pixel by the predetermined factor (m), the adjustment includes changing the first pixel intensity value to the second pixel intensity value divided by the estimated QE factor. If the exposure time of the second pixel being shorter than the exposure time of the first pixel by the predetermined factor (m), the adjustment includes changing the first pixel intensity value to the second pixel intensity value multiplied by the estimated QE factor.

In some embodiments, before adjusting the pixel intensity values using the estimated QE factor for the particular pixel position, the estimated QE factor may be fine-tuned for additional smoothness. For instance, the estimated QE factor corresponding to a first pixel position may be fine-tuned based on QE factors corresponding to pixel positions surrounding the first pixel position, e.g., by averaging the corresponding QE values.

The per-pixel LFM pipeline 320 is executed on all pixel positions in the frames 310. The execution may be in parallel to improve computation efficiency. After executing the per-pixel LFM pipeline 320 on all the pixel positions, a plurality of fine-tuned frames are generated. These fine-tuned frames may then be used as data for HDR fusion to generate the final image of the scene with the LED light sources.

FIG. 4 illustrates an example effect of LFM using a quad-pixel image sensor, according to some embodiments of this specification. The top four frames in FIG. 4 may be appreciated as the four frames 310 in FIG. 3, which are captured by the image sensor after configuring the quad-pixels with different exposure times. As shown, the first two images fail to capture the ON cycles of the LED source using their corresponding exposure settings. The last two frames successfully capture the ON cycles of the LED sources, with the last frame being slightly overexposed.

After performing the per-pixel regression model construction and per-pixel brightness fine-tuning described in FIG. 3, the four frames are fine-tuned as shown in the bottom section of FIG. 4. After fine-tuning, the first two frames have their pixels corresponding to the LED light sources lightened up proportionally to their corresponding exposure times (e.g., with the second frame being brighter than the first frame). In some embodiments, the slightly overexposed last frame may also be tuned down the brightness as a result of the fine-tuning.

Figure 5:
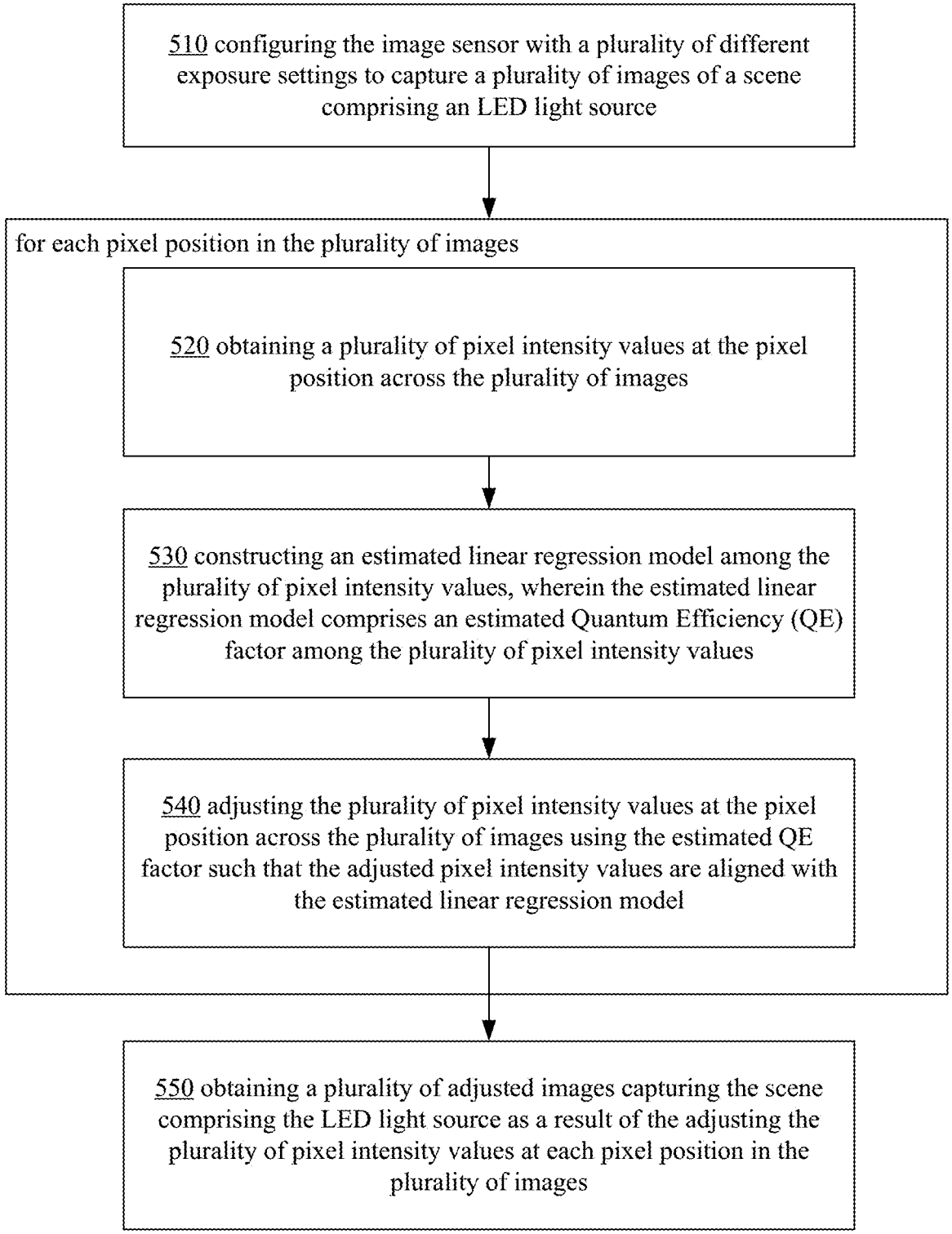
FIG. 5 illustrates an exemplary method for LFM using a quad-pixel image sensor, according to some embodiments of this specification.

FIG. 5 illustrates an exemplary method for LFM using a quad-pixel image sensor, according to some embodiments of this specification. The steps 510-530 illustrated in FIG. 5 are for illustration purposes. Depending on the implementation, the method 500 may include fewer, more, or alternative steps.

As shown, at step 510, the LFM method includes configuring the image sensor with a plurality of different exposure settings to capture a plurality of images of a scene comprising an LED light source. In some embodiments, the plurality of different exposure settings correspond to linearly increased exposure times by a predetermined factor. The plurality of different exposure settings include an initial setting with a base exposure time, and subsequent exposure settings have exposure times that are linearly increased from a previous exposure setting by the predetermined factor.

In some embodiments, the image sensor is a quad image sensor comprising a plurality of quaternions, each of the plurality of quaternions comprising a matrix of pixels. In some embodiments, the configuring the image sensor to capture a plurality of images using a plurality of different exposure settings includes: configuring exposure time for pixels in the quad image sensor such that the matrix of pixels within each quaternion have different exposure times, and corresponding pixels across the plurality of quaternions have a same exposure time. The corresponding pixels having the same exposure time across the plurality of quaternions capture one of the plurality of images.

At step 520, the LFM method includes for each pixel position in the plurality of images: obtaining a plurality of pixel intensity values at the pixel position across the plurality of images.

At step 530, the LFM method includes constructing an estimated linear regression model among the plurality of pixel intensity values, wherein the estimated linear regression model includes an estimated Quantum Efficiency (QE) factor among the plurality of pixel intensity values.

At step 540, the LFM method includes adjusting the plurality of pixel intensity values at the pixel position across the plurality of images using the estimated QE factor such that the adjusted pixel intensity values are aligned with the estimated linear regression model. In some embodiments, the adjusting the plurality of pixel intensity values using the estimated QE factor includes: identifying a first pixel intensity value of the plurality of pixel intensity values that captures an ON cycle of the LED light source; identifying a second pixel intensity value of the plurality of pixel intensity values that captures an OFF cycle of the LED light source; and adjusting the second pixel intensity value based on the first pixel intensity value and the estimated QE factor.

In some embodiments, the adjusting the plurality of pixel intensity values using the estimated QE factor includes: identifying a first pixel intensity value from the plurality of pixel intensity values, wherein the first pixel intensity value corresponds to a first pixel and has a distance away from the estimated linear regression model that is greater than a threshold; obtaining, from the plurality of pixel intensity values, a second pixel intensity value corresponding to a second pixel; and adjusting the first pixel intensity value of the first pixel based on the second pixel intensity value of the second pixel, the estimated QE factor, and exposure times corresponding to the first pixel and the second pixel. For example, in response to an exposure time of the second pixel being greater than an exposure time of the first pixel by the predetermined factor, the adjusting the first pixel intensity value includes: changing the first pixel intensity value to the second pixel intensity value divided by the estimated QE factor. As another example, in response to an exposure time of the second pixel being shorter than an exposure time of the first pixel by the predetermined factor, the adjusting the first pixel intensity value includes: changing the first pixel intensity value to the second pixel intensity value multiplied by the estimated QE factor.

At step 550, the LFM method includes obtaining a plurality of adjusted images capturing the scene comprising the LED light source as a result of the adjusting the plurality of pixel intensity values at each pixel position in the plurality of images.

In some embodiments, the LFM method further includes: before adjusting the plurality of pixel intensity values using the estimated QE factor, fine-tuning the estimated QE factor in the linear regression model corresponding to a first pixel position based on QE factors corresponding to pixel positions surrounding the first pixel position.

In some embodiments, the LFM method further includes: performing High Dynamic Range (HDR) fusion on the plurality of adjusted images to generate an HDR image of the scene comprising the LED light source.

Figure 6:
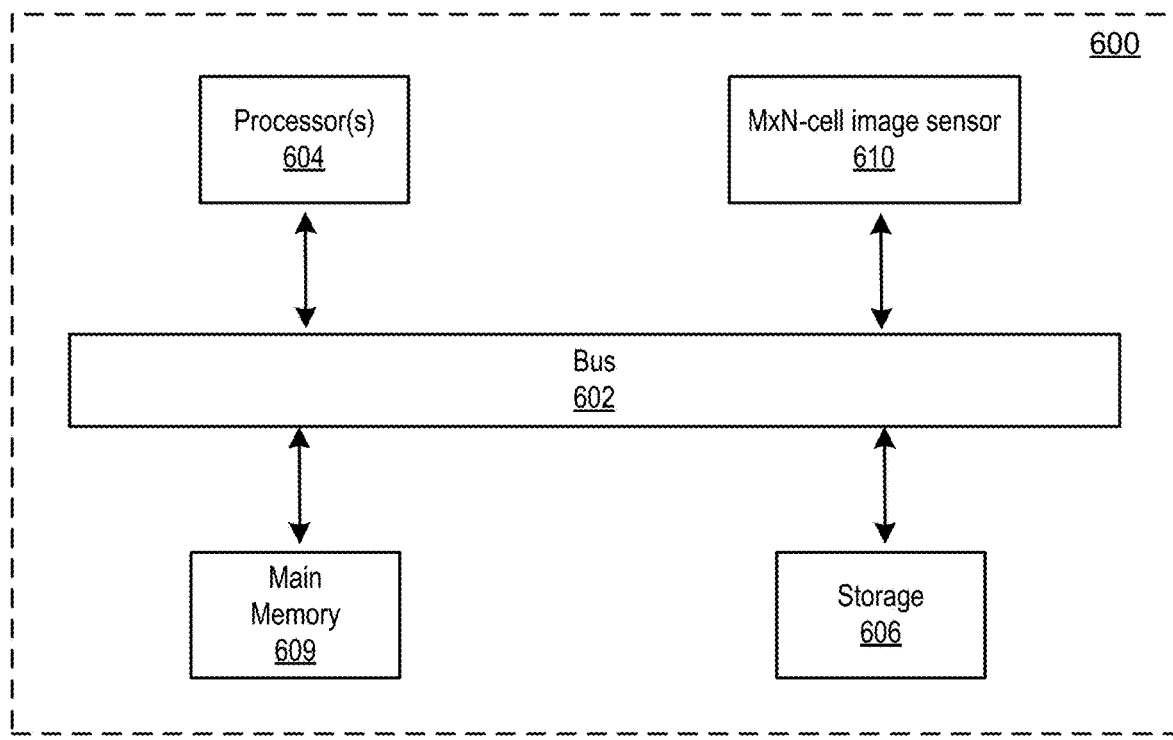
FIG. 6 is a schematic diagram of an example computing system for LFM using a quad-pixel image sensor, according to some embodiments of this specification.

FIG. 6 is a schematic diagram of an example computing system for LFM using a quad-pixel image sensor, according to some embodiments of this specification. The computer system 600 may be implemented in any of the components of the systems illustrated in FIGS. 1-5. One or more of the example methods illustrated by FIGS. 1-5 may be performed by one or more implementations of the computer system 600.

The computer system 600 may include a bus 602 or another communication mechanism for communicating information, and one or more hardware processor(s) 604 coupled with bus 602 for processing information. Hardware processor(s) 604 may be, for example, one or more general purpose microprocessors.

The computer system 600 may also include a main memory 609, such as a random-access memory (RAM), cache and/or other dynamic storage devices, coupled to bus 602 for storing information and instructions executable by processor(s) 604. Main memory 609 also may be used for storing temporary variables or other intermediate information during execution of instructions by processor(s) 604. Such instructions, when stored in storage media accessible to processor(s) 604, render computer system 600 into a special-purpose machine that is customized to perform the operations specified in the instructions. The computer system 600 may further include a read only memory (ROM) 609 or other static storage device coupled to bus 602 for storing static information and instructions for processor(s) 604. A storage device 606, such as a magnetic disk, optical disk, or USB thumb drive (flash drive), etc., may be provided and coupled to bus 602 for storing information and instructions.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the operations, methods, and processes described herein are performed by computer system 600 in response to processor(s) 604 executing one or more sequences of one or more instructions contained in main memory 609. Such instructions may be read into main memory 609 from another storage medium, such as storage device 606. Execution of the sequences of instructions contained in main memory 609 may cause processor(s) 604 to perform the process steps described herein. In alternative embodiments, hard-wired circuitry may be used in place of or in combination with software instructions.

The main memory 609, the ROM 609, and/or the storage device 606 may include non-transitory storage media. The term "non-transitory media," and similar terms, as used herein refers to media that stores data and/or instructions that cause a machine to operate in a specific fashion, that excludes transitory signals. Such non-transitory media may comprise non-volatile media and/or volatile media. Non-volatile media includes, for example, optical or magnetic disks, such as storage device 606. Volatile media includes dynamic memory, such as main memory 609. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 600 may include a M×N-cell image sensor 610 (or generally called spatially multiplexed image sensor) coupled to bus 602. The M×N-cell image sensor 610 may include a plurality of pixel groups, each pixel group having a M×N pixels configured with color filters of a same color such that the M×N pixels in each pixel group capture a same color.

The computer system 600 can send messages and receive data, including program code, through the network(s), network link, and M×N-cell image sensor 610. In the Internet example, a server might transmit a requested code for an application program through the Internet, the ISP, the local network, and the M×N-cell image sensor 610.

The received code may be executed by processor(s) 604 as it is received, and/or stored in storage device 606, or other non-volatile storage for later execution.

Each process, method, and algorithm described in the preceding sections may be embodied in, and fully or partially automated by, code modules executed by one or more computer systems or computer processors comprising computer hardware. The processes and algorithms may be implemented partially or wholly in the application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions that cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), or any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted or executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A Light-Emitting Diode (LED) Flickering Management (LFM) method for an image sensor, comprising:
configuring the image sensor with a plurality of different exposure settings to capture a plurality of images of a scene comprising an LED light source;
for each pixel position in the plurality of images:
obtaining a plurality of pixel intensity values at the pixel position across the plurality of images;
constructing an estimated linear regression model among the plurality of pixel intensity values, wherein the estimated linear regression model comprises an estimated Quantum Efficiency (QE) factor among the plurality of pixel intensity values;
adjusting the plurality of pixel intensity values at the pixel position across the plurality of images using the estimated QE factor such that the adjusted pixel intensity values are aligned with the estimated linear regression model; and
obtaining a plurality of adjusted images capturing the scene comprising the LED light source as a result of the adjusting the plurality of pixel intensity values at each pixel position in the plurality of images.

2. The LFM method of claim 1, wherein the plurality of different exposure settings correspond to linearly increased exposure times by a predetermined factor.

3. The LFM method of claim 2, wherein the plurality of different exposure settings comprise an initial setting with a base exposure time, and subsequent exposure settings have exposure times that are linearly increased from a previous exposure setting by the predetermined factor.

4. The LFM method of claim 2, wherein the adjusting the plurality of pixel intensity values using the estimated QE factor comprises:
identifying a first pixel intensity value from the plurality of pixel intensity values, wherein the first pixel intensity value corresponds to a first pixel and has a distance away from the estimated linear regression model that is greater than a threshold;
obtaining, from the plurality of pixel intensity values, a second pixel intensity value corresponding to a second pixel; and
adjusting the first pixel intensity value of the first pixel based on the second pixel intensity value of the second pixel, the estimated QE factor, and exposure times corresponding to the first pixel and the second pixel.

5. The LFM method of claim 4, wherein:
in response to an exposure time of the second pixel being greater than an exposure time of the first pixel by the predetermined factor, the adjusting the first pixel intensity value comprises:
changing the first pixel intensity value to the second pixel intensity value divided by the estimated QE factor.

6. The LFM method of claim 4, wherein:
in response to an exposure time of the second pixel being shorter than an exposure time of the first pixel by the predetermined factor, the adjusting the first pixel intensity value comprises:
changing the first pixel intensity value to the second pixel intensity value multiplied by the estimated QE factor.

7. The LFM method of claim 1, wherein the image sensor is a quad image sensor comprising a plurality of quaternions, each of the plurality of quaternions comprising a matrix of sensor pixels.

8. The LFM method of claim 7, wherein the configuring the image sensor to capture a plurality of images using a plurality of different exposure settings comprises:
configuring exposure time for sensor pixels in the quad image sensor such that the matrix of sensor pixels within each quaternion have different exposure times, and corresponding sensor pixels across the plurality of quaternions have a same exposure time.

9. The LFM method of claim 8, wherein the corresponding sensor pixels having the same exposure time across the plurality of quaternions capture one of the plurality of images.

10. The LFM method of claim 1, wherein the adjusting the plurality of pixel intensity values using the estimated QE factor comprises:
identifying a first pixel intensity value of the plurality of pixel intensity values that captures an ON cycle of the LED light source;
identifying a second pixel intensity value of the plurality of pixel intensity values that captures an OFF cycle of the LED light source; and
adjusting the second pixel intensity value based on the first pixel intensity value and the estimated QE factor.

11. The LFM method of claim 1, further comprising:
before adjusting the plurality of pixel intensity values using the estimated QE factor, fine-tuning the estimated QE factor in the linear regression model corresponding to a first pixel position based on QE factors corresponding to pixel positions surrounding the first pixel position.

12. The LFM method of claim 1, further comprising:
performing High Dynamic Range (HDR) fusion on the plurality of adjusted images to generate an HDR image of the scene comprising the LED light source.

13. A system, comprising one or more processors and one or more non-transitory computer-readable memories coupled to the one or more processors and configured with instructions executable by the one or more processors to cause the system to perform operations comprising:
configuring an image sensor with a plurality of different exposure settings to capture a plurality of images of a scene comprising an LED light source;
for each pixel position in the plurality of images:
obtaining a plurality of pixel intensity values at the pixel position across the plurality of images;
constructing an estimated linear regression model among the plurality of pixel intensity values, wherein the estimated linear regression model comprises an estimated Quantum Efficiency (QE) factor among the plurality of pixel intensity values;
adjusting the plurality of pixel intensity values at the pixel position across the plurality of images using the estimated QE factor such that the adjusted pixel intensity values are aligned with the estimated linear regression model; and obtaining a plurality of adjusted images capturing the scene comprising the LED light source as a result of the adjusting the plurality of pixel intensity values at each pixel position in the plurality of images.

14. The system of claim 13, wherein the plurality of different exposure settings correspond to linearly increased exposure times by a predetermined factor.

15. The system of claim 14, wherein the adjusting the plurality of pixel intensity values using the estimated QE factor comprises:

identifying a first pixel intensity value from the plurality of pixel intensity values, wherein the first pixel intensity value corresponds to a first pixel and has a distance away from the estimated linear regression model that is greater than a threshold;

obtaining, from the plurality of pixel intensity values, a second pixel intensity value corresponding to a second pixel; and adjusting the first pixel intensity value of the first pixel based on the second pixel intensity value of the second pixel, the estimated QE factor, and exposure times corresponding to the first pixel and the second pixel.

16. The system of claim 15, wherein in response to an exposure time of the second pixel being greater than an exposure time of the first pixel by the predetermined factor, the adjusting the first pixel intensity value comprises:

changing the first pixel intensity value to the second pixel intensity value divided by the estimated QE factor.

17. The system of claim 13, wherein the image sensor is a quad image sensor comprising a plurality of quaternions, each of the plurality of quaternions comprising a matrix of sensor pixels.

18. The system of claim 17, wherein the configuring the image sensor to capture a plurality of images using a plurality of different exposure settings comprises:

configuring exposure time for sensor pixels in the quad image sensor such that the matrix of sensor pixels within each quaternion have different exposure times, and corresponding sensor pixels across the plurality of quaternions have a same exposure time.

19. The system of claim 13, wherein the adjusting the plurality of pixel intensity values using the estimated QE factor comprises:

identifying a first pixel intensity value of the plurality of pixel intensity values that captures an ON cycle of the LED light source;

identifying a second pixel intensity value of the plurality of pixel intensity values that captures an OFF cycle of the LED light source; and adjusting the second pixel intensity value based on the first pixel intensity value and the estimated QE factor.

20. A non-transitory computer-readable storage medium configured with instructions executable by one or more processors to cause the one or more processors to perform operations comprising:

configuring an image sensor with a plurality of different exposure settings to capture a plurality of images of a scene comprising an LED light source;

for each pixel position in the plurality of images:

obtaining a plurality of pixel intensity values at the pixel position across the plurality of images;

constructing an estimated linear regression model among the plurality of pixel intensity values, wherein the estimated linear regression model comprises an estimated Quantum Efficiency (QE) factor among the plurality of pixel intensity values;

adjusting the plurality of pixel intensity values at the pixel position across the plurality of images using the estimated QE factor such that the adjusted pixel intensity values are aligned with the estimated linear regression model; and obtaining a plurality of adjusted images capturing the scene comprising the LED light source as a result of the adjusting the plurality of pixel intensity values at each pixel position in the plurality of images.

* * * * *